US009916854B2

(12) United States Patent
McTeer et al.

(10) Patent No.: US 9,916,854 B2
(45) Date of Patent: Mar. 13, 2018

(54) SYSTEMS AND METHODS FOR REMOVING MEDIA FROM A SEQUENTIAL MEDIA DRIVE

(71) Applicant: Dell Products L.P., Round Rock, TX (US)

(72) Inventors: Elizabeth A. McTeer, Austin, TX (US); Randy M. Ortiz, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/174,621

(22) Filed: Jun. 6, 2016

(65) Prior Publication Data
US 2017/0352373 A1    Dec. 7, 2017

(51) Int. Cl.
  *G11B 15/67*  (2006.01)
  *G11B 15/675*  (2006.01)
  *G11B 5/008*  (2006.01)
  *G11B 33/04*  (2006.01)
(52) U.S. Cl.
  CPC ........ *G11B 15/675* (2013.01); *G11B 5/00813* (2013.01); *G11B 33/04* (2013.01)
(58) Field of Classification Search
  CPC .... G11B 15/675; G11B 33/04; G11B 5/00813
  See application file for complete search history.

(56) References Cited

U.S. PATENT DOCUMENTS

| | | | | |
|---|---|---|---|---|
| 3,961,370 A | * | 6/1976 | Wenner | G11B 15/1891 242/326.1 |
| 4,629,307 A | * | 12/1986 | Miyai | G03G 15/00 399/124 |
| 4,664,504 A | * | 5/1987 | Oda | G03G 15/06 399/149 |
| 4,685,095 A | * | 8/1987 | Rudy | G11B 17/225 369/30.43 |
| 4,777,548 A | * | 10/1988 | Dow | G11B 15/67 360/137 |
| 4,945,429 A | * | 7/1990 | Munro | G11B 15/6835 198/349.6 |
| 5,051,761 A | * | 9/1991 | Fisher | B41J 2/16535 347/30 |
| 5,172,872 A | * | 12/1992 | Barton, Jr. | G11B 15/662 242/571.6 |
| 5,209,417 A | * | 5/1993 | Benes | G11B 23/113 242/527 |
| 5,257,747 A | * | 11/1993 | Mann | G11B 23/087 242/326.1 |

(Continued)

*Primary Examiner* — Brian Miller
(74) *Attorney, Agent, or Firm* — Jackson Walker L.L.P.

(57) ABSTRACT

In accordance with embodiments of the present disclosure, a sequential storage media drive may include a first reel for rotatably winding sequential storage media tape from an opposing second reel of a data cartridge, an enclosure for housing the first reel and housing the data cartridge when the data cartridge is inserted into the sequential storage media drive and an access door mechanically coupled to the enclosure, the access door configured to be translated from a closed position to an open position to allow a user to access the first reel from an exterior of the enclosure in the event the data cartridge of the sequential storage media tape becomes lodged in the sequential storage media drive.

15 Claims, 6 Drawing Sheets

(56) References Cited

U.S. PATENT DOCUMENTS

| | | | | |
|---|---|---|---|---|
| 5,279,475 A | * | 1/1994 | Skavnak | G11B 25/066 242/336 |
| 5,316,235 A | * | 5/1994 | East | G11B 23/087 242/346 |
| 5,416,914 A | * | 5/1995 | Korngiebel | G11B 15/68 369/34.01 |
| 5,454,485 A | * | 10/1995 | Dalziel | G11B 17/24 221/154 |
| 5,456,792 A | * | 10/1995 | Rodriguez | B65H 19/262 156/523 |
| 5,515,959 A | * | 5/1996 | Stephenson, III | E05D 7/1066 16/267 |
| 5,619,246 A | * | 4/1997 | Straayer | H04N 1/0057 346/134 |
| 5,652,742 A | * | 7/1997 | Baca | G11B 23/0236 360/98.04 |
| 5,808,645 A | * | 9/1998 | Reeves | B41J 2/0057 347/101 |
| 5,876,131 A | * | 3/1999 | Parker | B41J 3/36 281/21.1 |
| 5,901,916 A | * | 5/1999 | McAllister | G11B 23/043 242/338.1 |
| 5,906,324 A | * | 5/1999 | Adams | G03B 1/58 242/332.8 |
| 5,915,909 A | * | 6/1999 | Smith | B65G 1/0435 187/360 |
| 5,991,572 A | * | 11/1999 | Cho | G03G 15/2064 399/122 |
| 6,158,942 A | * | 12/2000 | Apple | G11B 15/6825 312/287 |
| 6,347,020 B1 | * | 2/2002 | Carpenter | G11B 15/686 360/92.1 |
| 6,591,164 B1 | * | 7/2003 | Plutt | G11B 15/6835 369/30.31 |
| 7,181,313 B2 | * | 2/2007 | Studebaker | G11B 15/6835 414/331.02 |
| 7,255,525 B2 | * | 8/2007 | Smith | G11B 17/225 414/273 |
| 7,378,270 B2 | * | 5/2008 | Azarnia | G01N 33/48764 422/82.05 |
| 7,407,127 B2 | * | 8/2008 | Sachuk | G11B 23/107 242/346.2 |
| 7,790,994 B2 | * | 9/2010 | Mason | H02B 11/127 200/50.21 |
| 7,898,758 B2 | * | 3/2011 | Leopold, Jr. | G11B 15/20 360/53 |
| 8,230,501 B2 | * | 7/2012 | Haustein | G07C 9/00142 709/217 |
| 2009/0128955 A1 | * | 5/2009 | Moses | G11B 23/107 360/132 |
| 2011/0064427 A1 | * | 3/2011 | Yoshida | B65H 43/04 399/21 |

\* cited by examiner

SYSTEMS AND METHODS FOR REMOVING MEDIA FROM A SEQUENTIAL MEDIA DRIVE

TECHNICAL FIELD

The present disclosure relates in general to information handling systems, and more particularly to systems and methods for removing magnetic storage media from a sequential storage media drive.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Sequential storage media, also known as tape media, may comprise a reel of a magnetic strip of material in which one or more magnetic heads are used to write data on the media and/or read data from the media. When a single-hub sequential magnetic storage media cartridge, such as a Linear Tape Open (LTO) cartridge is loaded into a sequential storage media drive (or a "tape drive") numerous conditions may occur which may cause the cartridge or the strip of media to become lodged or "stuck" in the drive.

Such a situation may be highly undesirable for a user of the media cartridge, as data on the media may be lost when the drive is returned to a supplier or vendor as part of a hardware replacement process. In addition, a user may be concerned about confidential information stored on the media, and may forcibly remove the cover of a drive in order to retrieve the media. Such action may likely induce damage to the drive itself, rendering the drive unfit for refurbishing or repair.

SUMMARY

In accordance with the teachings of the present disclosure, the disadvantages and problems associated with retrieving lodged sequential magnetic storage media from a sequential media drive may be reduced or eliminated.

In accordance with embodiments of the present disclosure, a sequential storage media drive may include a first reel for rotatably winding sequential storage media tape from an opposing second reel of a data cartridge, an enclosure for housing the first reel and housing the data cartridge when the data cartridge is inserted into the sequential storage media drive and an access door mechanically coupled to the enclosure, the access door configured to be translated from a closed position to an open position to allow a user to access the first reel from an exterior of the enclosure in the event the data cartridge of the sequential storage media tape becomes lodged in the sequential storage media drive.

In accordance with these and other embodiments of the present disclosure, an information handling system may include a processor and a sequential storage media drive communicatively coupled to the processor. The sequential storage media drive may include a first reel for rotatably winding sequential storage media tape from an opposing second reel of a data cartridge, an enclosure for housing the first reel and housing the data cartridge when the data cartridge is inserted into the sequential storage media drive, and an access door mechanically coupled to the enclosure, the access door configured to be translated from a closed position to an open position to allow a user to access the first reel from an exterior of the enclosure in the event the data cartridge of the sequential storage media tape becomes lodged in the sequential storage media drive.

In accordance with these and other embodiments of the present disclosure, a method may include providing a first reel for rotatably winding sequential storage media tape from an opposing second reel of a data cartridge within a sequential storage media drive, enclosing the first reel with an enclosure for housing the first reel and housing the data cartridge when the data cartridge is inserted into the sequential storage media drive, and mechanically coupling an access door to the enclosure, the access door configured to be translated from a closed position to an open position to allow a user to access the first reel from an exterior of the enclosure in the event the data cartridge of the sequential storage media tape becomes lodged in the sequential storage media drive.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
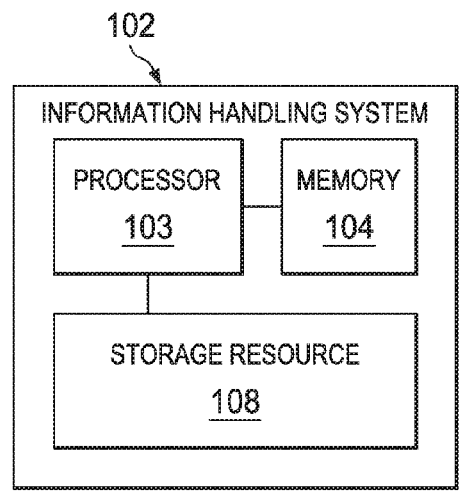
FIG. 1 illustrates a block diagram of selected components of an example information handling system, in accordance with embodiments of the present disclosure.

FIG. 1 illustrates a functional block diagram of selected components of an example information handling system 102, in accordance with embodiments of the present disclosure. In some embodiments, information handling system 102 may be a personal computer (e.g., a desktop computer or a portable computer). In other embodiments, information handling system 102 may comprise a storage server for archiving data.

As depicted in FIG. 1, information handling system 102 may include a processor 103, a memory 104 communicatively coupled to processor 103, and a storage resource 108 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 108, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

Storage resource 108 may include a system, device, or apparatus configured to store data. Storage resource 108 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage resource 108 may include one or more storage enclosures configured to hold and/or power one or more of such devices. In the embodiments represented by FIG. 1, storage resource 108 may reside within information handling system 102. However, in other embodiments, storage resource 108 may reside external to information handling system 102 (e.g., may be coupled to information handling system 102 via a network).

In particular embodiments, storage resource 108 may comprise a sequential storage media system. A sequential storage media system may comprise any system, device, or apparatus for storing or recording information on sequential storage media (e.g., magnetic tape). Such sequential storage media may be packaged in cartridges or cassettes.

In addition to processor 103, memory 104, and storage resource 108, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2:
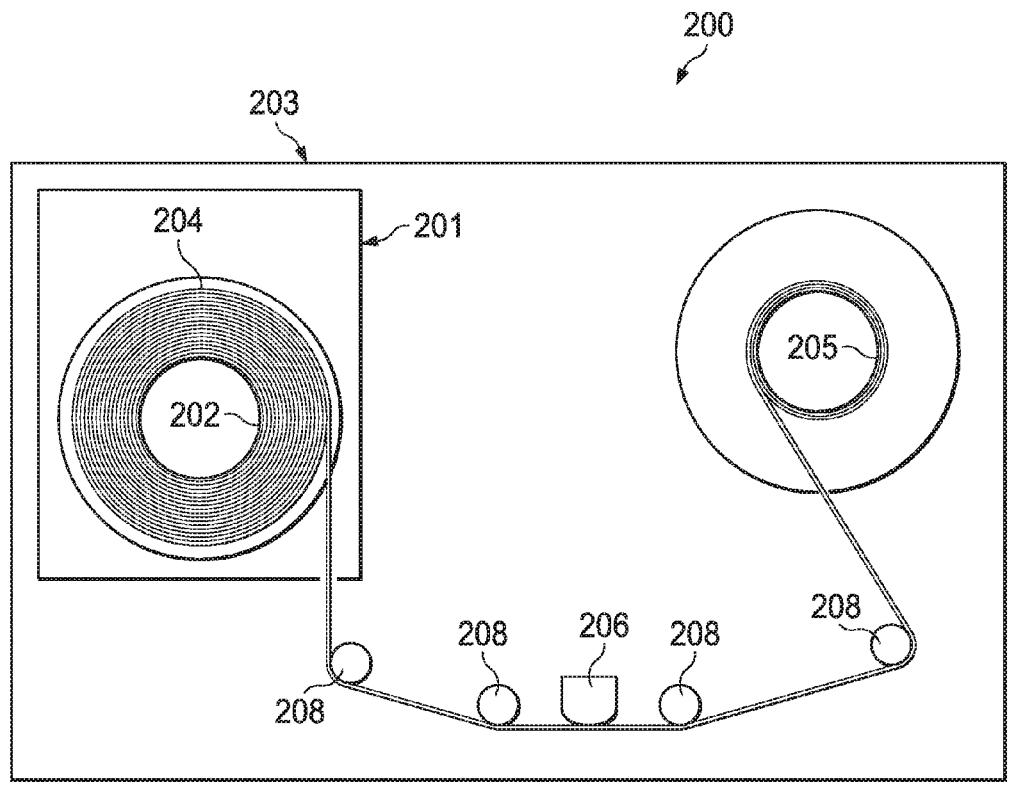
FIG. 2 illustrates a block diagram of selected components of an example sequential storage media system, in accordance with embodiments of the present disclosure.

FIG. 2 illustrates a block diagram of selected components of an example sequential storage media system 200, in accordance with embodiments of the present disclosure. Sequential storage media system 200 may be used as, or as part of, storage resource 108 of information handling system 102 of FIG. 1. As shown in FIG. 2, sequential storage media system 200 may comprise a removable data cartridge 201 and a sequential storage media drive 203.

Data cartridge 201 may include a reel 202 for carrying sequential storage media tape 204. Reel 202 may comprise any suitable system, device, or apparatus for carrying sequential storage media tape 204, and winding sequential storage media tape 204 between itself and reel 205. Accordingly, reel 202 may be configured to engage with a chuck or other mechanical feature (e.g., driven by a motor or other drive system) of sequential storage media drive 203 for driving reel 202 in a rotational manner in order to wind sequential storage media tape 204 from reel 205 to reel 202.

Sequential storage media drive 203 may include a reel 205, a read/write head 206, and a plurality of guides 208. Reel 205 may comprise any suitable system, device, or apparatus for carrying sequential storage media tape 204, and winding sequential storage media tape 204 between reel 202 and reel 205. Accordingly, reel 202 may be configured to engage with a chuck or other mechanical feature (e.g., driven by a motor or other drive system) of sequential storage media drive 203 for driving reel 205 in a rotational manner in order to wind sequential storage media tape 204 from reel 202 to reel 205.

As sequential storage media tape 204 is translated between reels 202 and 205, continuous portions of sequential storage media tape 204 may come in contact with head 206. Head 206 may comprise any system, device, or apparatus configured to read data from and/or write data to sequential storage media tape 204 as continuous portions of sequential storage media tape 204 pass over such head 206 by modifying the magnetization of sequential storage media of sequential storage media tape 204 in accordance with the information to be written. In some embodiments, head 206 may comprise a read/write head which is also capable of reading data from sequential storage media of sequential storage media tape 204 by detecting the magnetization of such sequential storage media.

In order to guide sequential storage media tape 204 to contact with a head 206 as it is wound between reels 202 and 205, sequential storage media system 200 may include guides 208. One or more of guides 208 may be capable of rotation about an axis (e.g., wherein such axis is perpendicular to the view shown in FIG. 2) such that guides 208 may rotate as sequential storage media tape 204 passes over them, thus facilitating the winding of sequential storage media tape 204 as it passes over head 206.

Figure 3A:
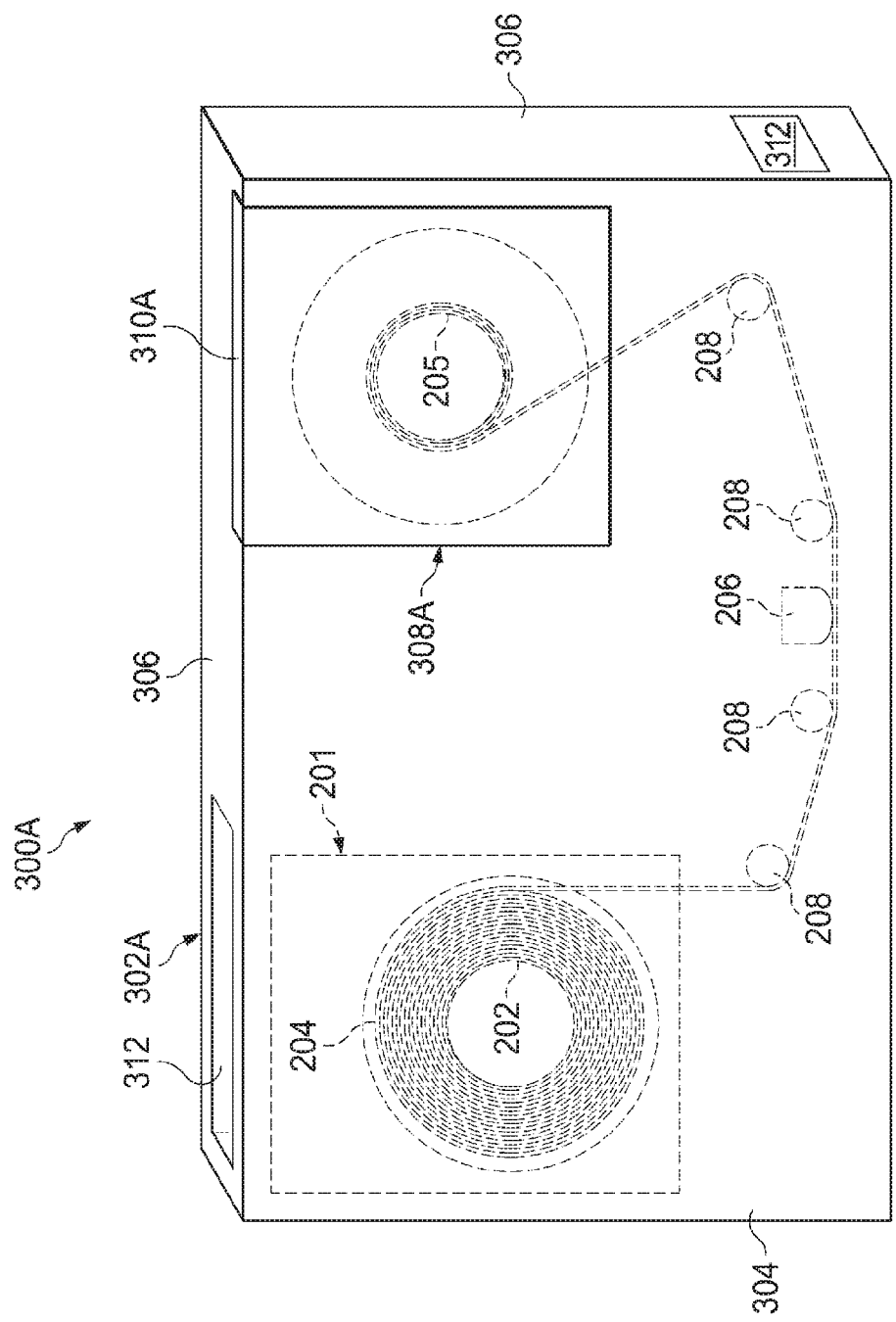
FIG. 3A illustrates a plan view of selected components of an example sequential storage media drive, in accordance with embodiments of the present disclosure.

FIG. 3A illustrates a plan view of selected components of an example sequential storage media drive 300A, in accordance with embodiments of the present disclosure. As shown in FIG. 3A, sequential storage media drive 300A may include an enclosure 302A for housing components of sequential storage media system 200 (e.g., data cartridge 201, reel 202, sequential storage media tape 204, reel 205, head 206, and guides 208, which are depicted with dashed lines in FIGS. 3A and 3B, to indicate that such components are internal to enclosure 302). Data cartridge 201 may be loaded into enclosure 302A via opening 312. Also as shown in FIG. 3A, enclosure 302A may include a top cover 304 which has a generally planar shape wherein a plane defined by the generally planar shape is perpendicular to the axes of reels 202 and 205. Although not explicitly shown, enclosure 302A may also include a bottom cover opposite that of top cover 304. Enclosure 302A may also include a plurality of sides 306 extending between such bottom cover and top cover 304.

In addition, enclosure 302A may include a generally planar access door 308A hingedly coupled to the remainder of enclosure 302A via a hinge 310A, such that when access door 308A is in a closed position, a plane defined by the generally planar shape of access door 308A is generally parallel to the plane defined by the generally planar shape of top cover 304. In operation, access door 308A may be rotated about hinge 310A into an open position, that provides access to reel 205 from the exterior of enclosure 302A. Although FIG. 3A depicts access door 308A on top cover 304, in some embodiments access door 308A may be formed on a bottom cover (not explicitly shown) opposite of top cover 304.

Figure 3B:
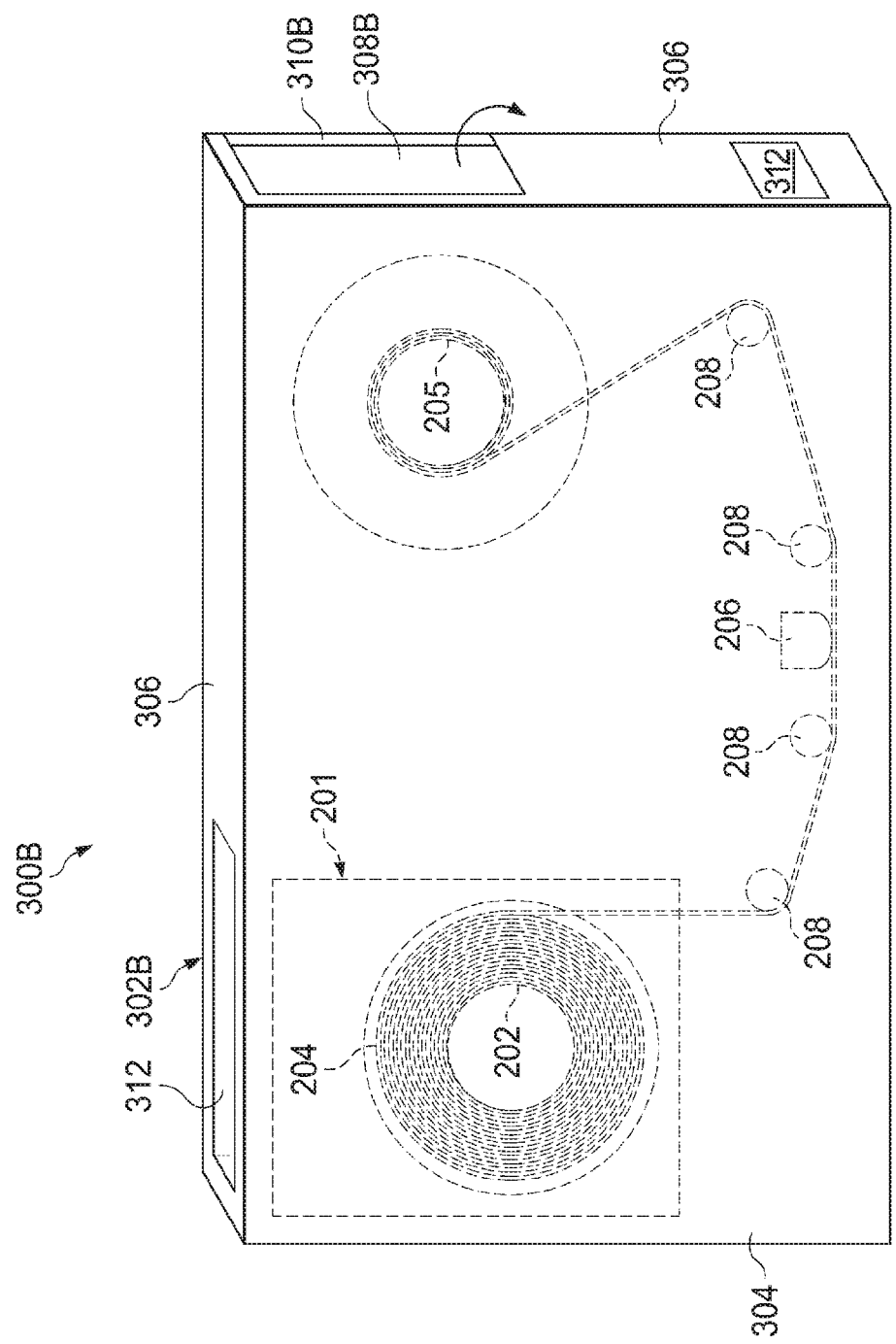
FIGS. 3B-3D illustrate plan views of selected components of an example sequential storage media drive, in accordance with embodiments of the present disclosure.
Figure 3C:
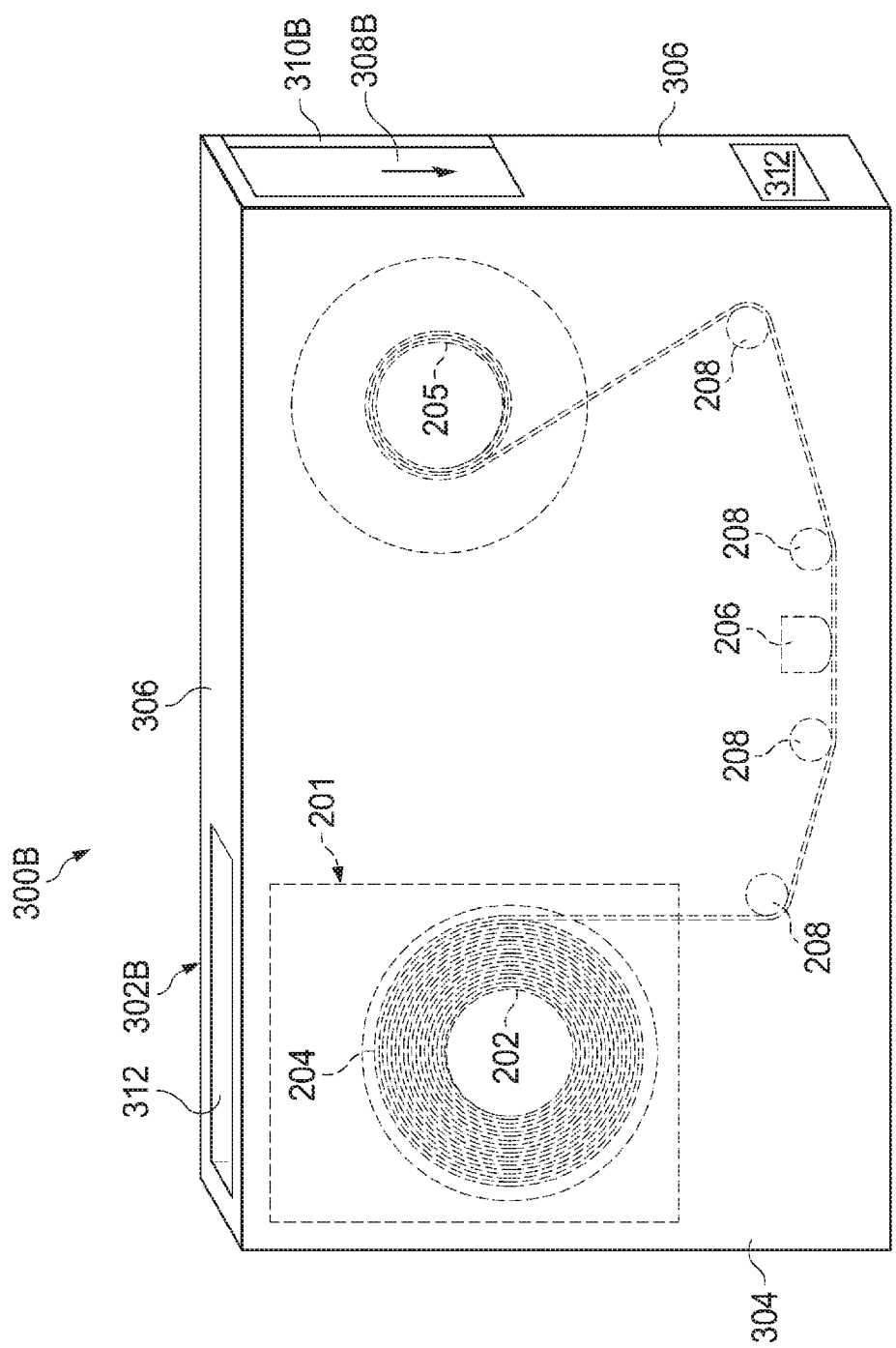
Figure 3D:
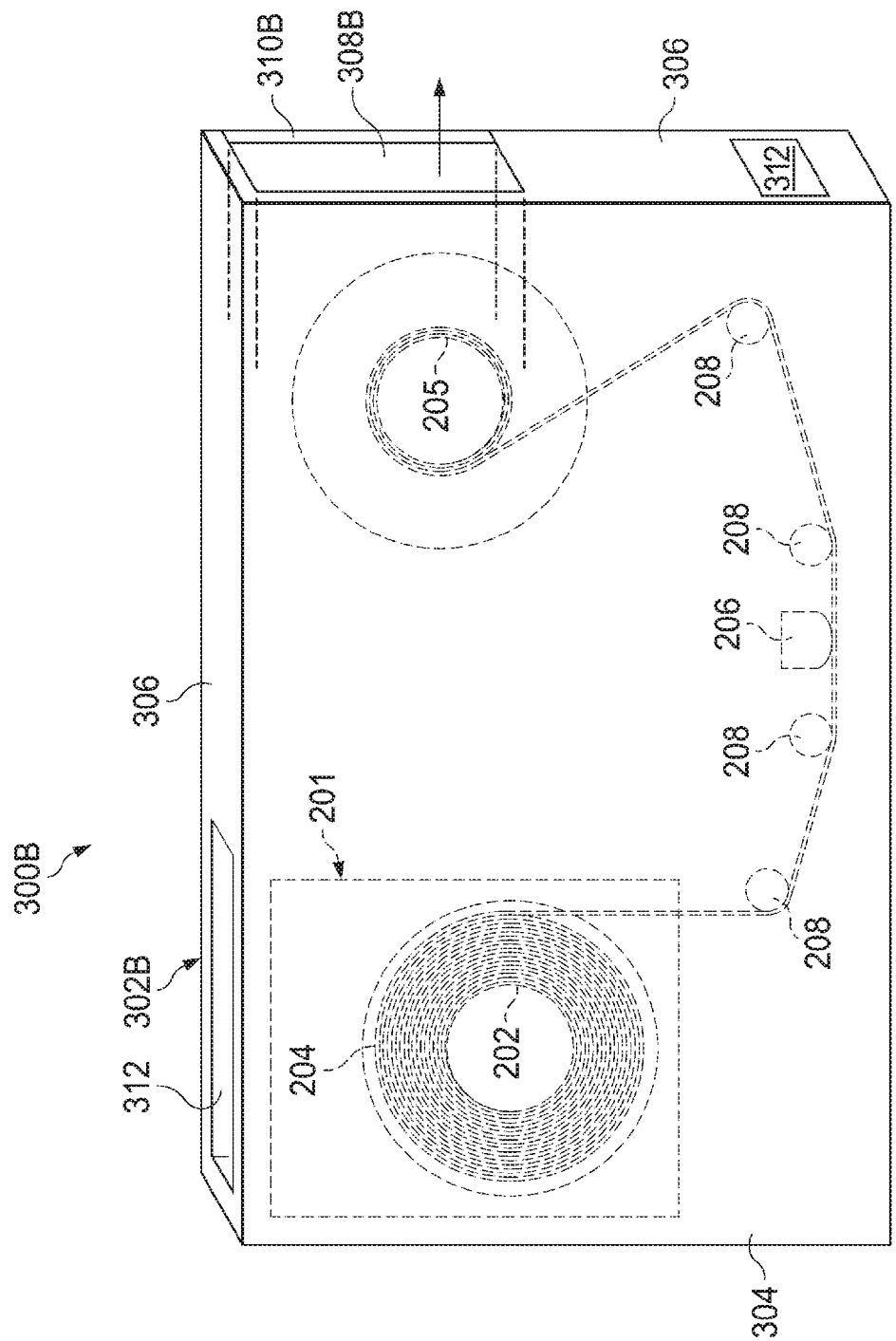

FIGS. 3B-3D illustrate plan views of selected components of an example sequential storage media drive 300B, in accordance with embodiments of the present disclosure. Sequential storage media drive 300B may be similar in many respects to sequential storage media drive 300A, and thus, only the main differences between sequential storage media drive 300B and sequential storage media drive 300A are described herein. The main difference is that in FIG. 3B, sequential storage media drive 300B comprises an enclosure 302B that differs from enclosure 302A in that enclosure 302B may include a generally planar access door 308B (in lieu of access door 308A) hingedly coupled to the remainder of enclosure 302B via a hinge 310B (in lieu of hinge 310A), such that when access door 308B is in a closed position, a plane defined by the generally planar shape of access door 308B is perpendicular to the plane defined by the generally planar shape of top cover 304. In operation, access door 308B may be rotated about hinge 310B into an open position, that provides access to reel 205 from the exterior of enclosure 302B. As shown in FIGS. 3C-3D, in some embodiments access door 308B may be slidably coupled to enclosure 302B in a drawer-like manner, which, when translated from a closed position to an open position, would allow reel 205 to slide out from inside enclosure 302B.

In operation, if data cartridge 201 and/or sequential storage media tape 204 becomes lodged within either of sequential storage media drive 300A or sequential storage media drive 300B (each of which may generally be referred to herein as sequential storage media drive 300), a user may power down sequential storage media drive 300, remove its power cord, and remove sequential storage media drive 300 from a chassis or other enclosure housing sequential storage media drive 300. Then, the user may, by applying an appropriate mechanical force to access door 308A or 308B (each of which may generally be referred to herein as access door 308), cause access door 308 to translate from its closed position to its open position, allowing the user access to remove reel 205 from enclosure 302A or 302B (each of which may generally be referred to herein as enclosure 302).

In some embodiments, access door 308 may be locked under normal operating conditions so as to protect from any safety hazards. Sequential storage media drive 300 may include a mechanical trigger or latch such as latch 312 to release access door 308. In some embodiments, the same trigger or latch could also release reel 205. In other embodiments, another trigger or latch could release reel 205. Once accessible, the user may remove reel 205 from enclosure 302.

Figure 4:
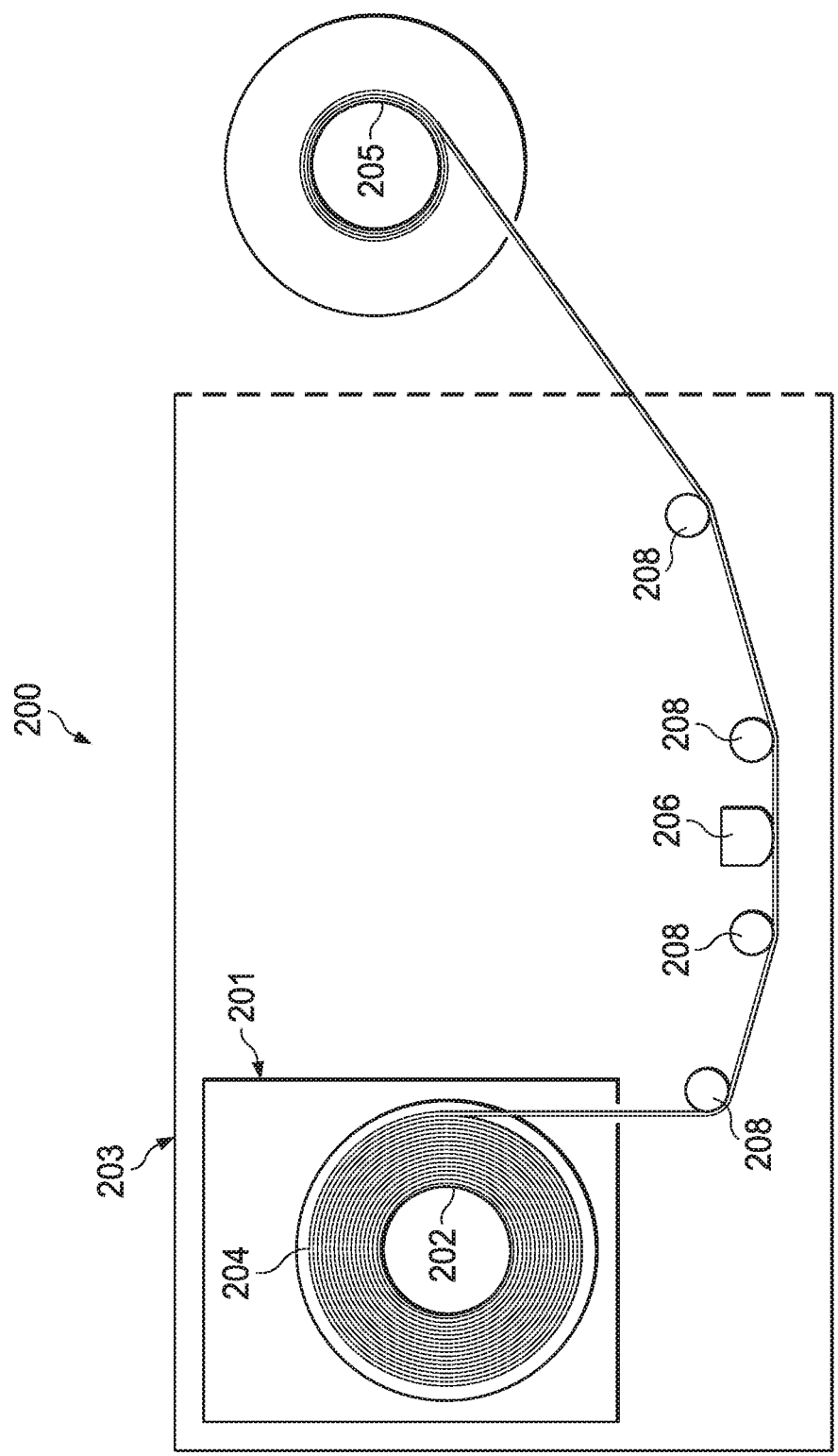
FIG. 4 illustrates a plan view of selected components of an example sequential storage media drive with a reel removed, in accordance with embodiments of the present disclosure.

Once reel 205 is removed, as shown in FIG. 4, sequential storage media tape 204 may be unspooled from reel 205, and a sequential storage media tape leader pin (not explicitly shown) may be disconnected from reel 205 by the user. This may allow sequential storage media tape 204 to be removed from the tape path and rewound into reel 202 of data cartridge 201. After rewinding sequential storage media tape 204 into reel 202, the user may eject data cartridge 201 from sequential storage media drive 300, allowing sequential storage media tape 204 to be completely removed from sequential storage media drive 200.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A sequential storage media drive comprising:
    a first reel for rotatably winding sequential storage media tape from an opposing second reel of a data cartridge;
    an enclosure for housing the first reel and housing the data cartridge when the data cartridge is inserted into the sequential storage media drive via a first opening of the sequential storage media drive;
    a mechanical latch for disengaging the first reel from the sequential storage media drive; and
    an access door mechanically coupled to the enclosure, the access door configured to be translated from a closed position to an open position to create a second opening of the sequential storage media drive to allow a user to access the first reel and at least a portion of the sequential storage media tape from an exterior of the enclosure via the second opening in the event that the data cartridge of the sequential storage media tape becomes lodged in the sequential storage media drive, wherein the second opening is different from the first opening, and wherein accessing the first reel includes actuating the mechanical latch and removing the first reel from the sequential storage media drive.

2. The sequential storage media drive of claim 1, wherein the access door is rotatably coupled to the enclosure via a hinge.

3. The sequential storage media drive of claim 1, wherein the access door is slideably coupled to the enclosure in a drawer-like manner.

4. The sequential storage media drive of claim 1, wherein the access door is generally planar in shape and defines a plane which is generally perpendicular to an axis of rotation of the first reel when the first reel is housed within the enclosure.

5. The sequential storage media drive of claim 1, wherein the access door is generally planar in shape and defines a plane which is generally parallel to an axis of rotation of the first reel when the first reel is housed within the enclosure.

6. An information handling system comprising:
    a processor; and
    a sequential storage media drive communicatively coupled to the processor and comprising:
        a first reel for rotatably winding sequential storage media tape from an opposing second reel of a data cartridge;
        an enclosure for housing the first reel and housing the data cartridge when the data cartridge is inserted into the sequential storage media drive via a first opening of the sequential storage media drive;
        a mechanical latch for disengaging the first reel from the sequential storage media drive; and
        an access door mechanically coupled to the enclosure, the access door configured to be translated from a closed position to an open position to create a second opening of the sequential storage media drive to allow a user to access the first reel and at least a portion of the sequential storage media tape from an exterior of the enclosure via the second opening in the event that the data cartridge of the sequential storage media tape becomes lodged in the sequential storage media drive, wherein the second opening is different from the first opening, and wherein accessing the first reel includes actuating the mechanical latch and removing the first reel from the sequential storage media drive.

7. The information handling system of claim 6, wherein the access door is rotatably coupled to the enclosure via a hinge.

8. The information handling system of claim 6, wherein the access door is slideably coupled to the enclosure in a drawer-like manner.

9. The information handling system of claim 6, wherein the access door is generally planar in shape and defines a plane which is generally perpendicular to an axis of rotation of the first reel when the first reel is housed within the enclosure.

10. The information handling system of claim 6, wherein the access door is generally planar in shape and defines a plane which is generally parallel to an axis of rotation of the first reel when the first reel is housed within the enclosure.

11. A method comprising:
    providing a first reel for rotatably winding sequential storage media tape from an opposing second reel of a data cartridge within a sequential storage media drive, wherein the sequential storage media drive includes a mechanical latch for disengaging the first reel from the sequential storage media drive;
    enclosing the first reel with an enclosure for housing the first reel and housing the data cartridge when the data cartridge is inserted into the sequential storage media drive via a first opening of the sequential storage media drive; and
    mechanically coupling an access door to the enclosure, the access door configured to be translated from a closed position to an open position to create a second opening of the sequential storage media drive to allow a user to access the first reel and at least a portion of the sequential storage media tape from an exterior of the enclosure via the second opening in the event that the data cartridge of the sequential storage media tape becomes lodged in the sequential storage media drive, wherein the second opening is different from the first opening, and wherein accessing the first reel includes actuating the mechanical latch and removing the first reel from the sequential storage media drive.

12. The method of claim 11, further comprising rotatably coupling the access door to the enclosure via a hinge.

13. The method of claim 11, further comprising slideably coupling the access door to the enclosure in a drawer-like manner.

14. The method of claim 11, further comprising coupling the access door to the enclosure such that a plane defined by a generally planar shape of the access door is generally perpendicular to an axis of rotation of the first reel when the first reel is housed within the enclosure.

15. The method of claim 11, further comprising coupling the access door to the enclosure such that a plane defined by a generally planar shape of the access door is generally parallel to an axis of rotation of the first reel when the first reel is housed within the enclosure.

* * * * *